Nov. 25, 1924.  
F. ARCHER  
WHEEL RIM  
Filed April 11, 1923  
1,516,904  
2 Sheets-Sheet 1

Inventor  
Frank Archer  
By  
Attorney

Nov. 25, 1924.
F. ARCHER
WHEEL RIM
Filed April 11, 1923   2 Sheets-Sheet 2
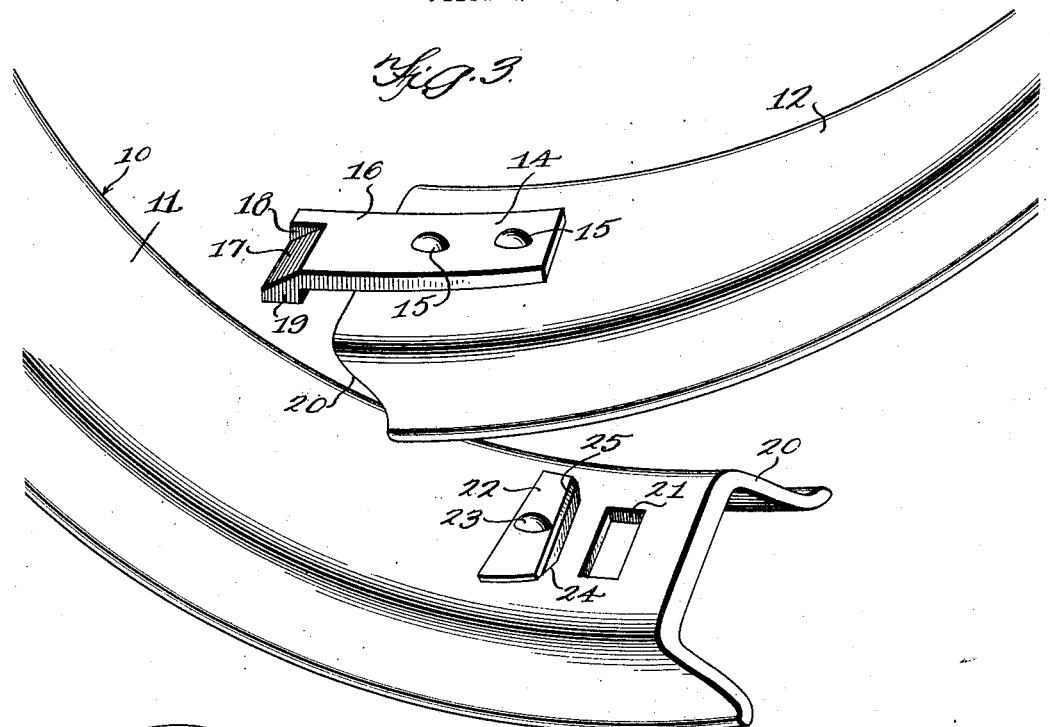
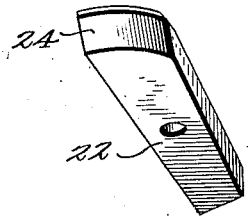
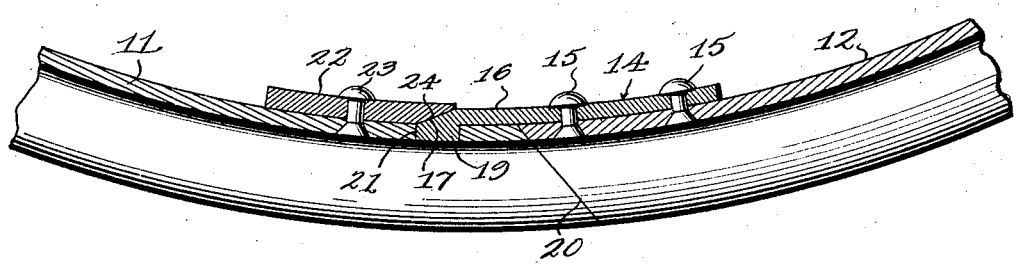
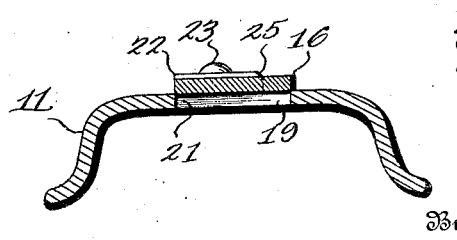
Inventor
Frank Archer,
By
Attorney Patented Nov. 25, 1924.

1,516,904

UNITED STATES PATENT OFFICE.

FRANK ARCHER, OF ERIE, PENNSYLVANIA.

WHEEL RIM.

Application filed April 11, 1923. Serial No. 631,443.

*To all whom it may concern:*

Be it known that I, FRANK ARCHER, a citizen of the United States, residing at Erie, in the county of Erie and State of Pennsylvania, have invented certain new and useful Improvements in Wheel Rims, of which the following is a specification.

This invention relates to wheel rims and more particularly to automobile tire rims of the collapsible type wherein there is provided a hinged section which is adapted to be swung inwardly to facilitate applying and removing the tire.

An important object of the present invention is to provide a rim of the above mentioned character which is characterized by simplicity in construction and operation.

A further object of the invention is to provide such a device having novel means of extremely simple construction for locking the hinged member in normal position.

Other objects and advantages of the invention will be apparent during the course of the following description.

In the drawings, I have shown one embodiment of the invention. In this showing,

Figure 3 is a fragmentary perspective view of the free ends of the rim in collapsed position, Figure 4 is a detail perspective view of the pivoted locking member, Figure 5 is a section taken on line 5—5 of Figure 2, and, Figure 6 is a similar view taken on line 6—6 of Figure 2.

Figure 1:
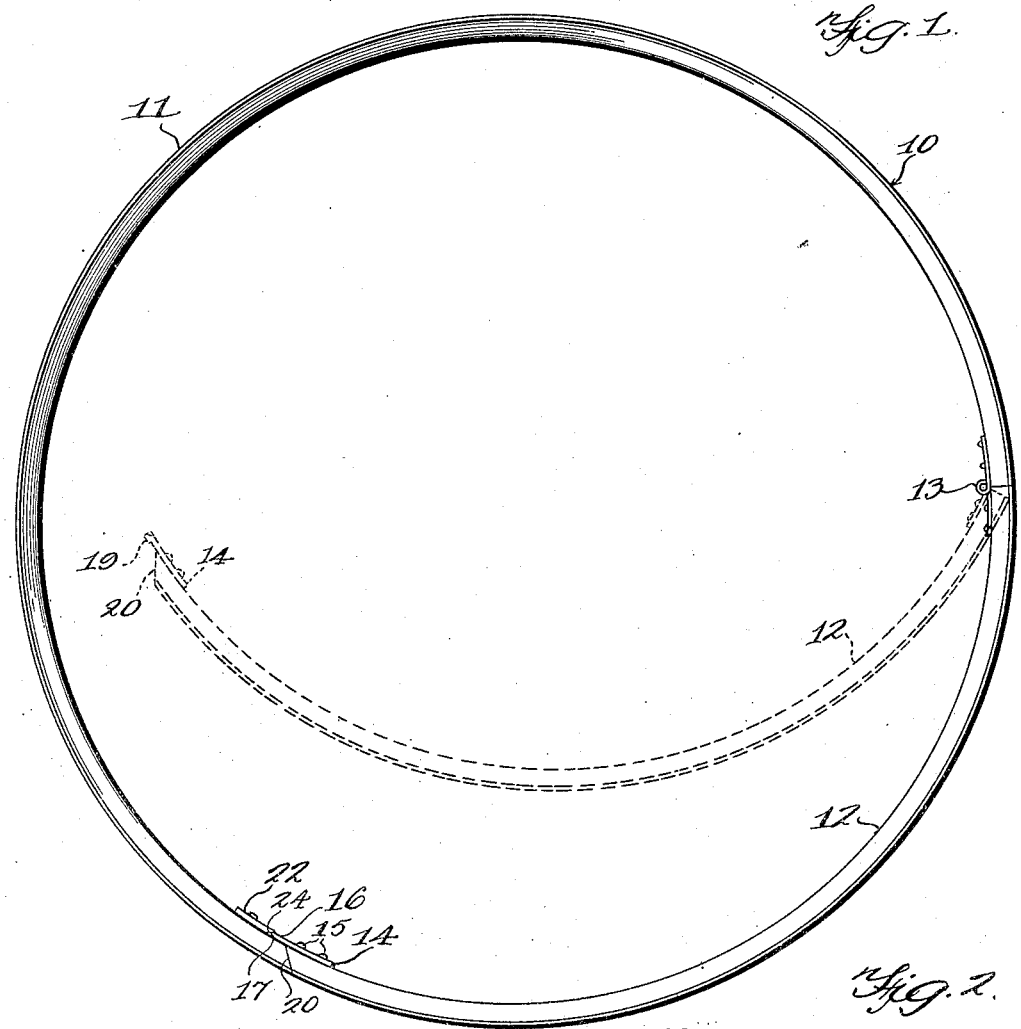
Figure 1 is a side elevation of a rim embodying the invention.

Referring to the drawings, the numeral 10 designates a rim of any standard type, shown in this instance as being of the straight side type. The rim comprises a relatively stationary section 11 and a movable section 12. As shown, the movable section consists of approximately one-third of the entire rim length but the invention is not limited to the particular proportions of the two rim sections. One end of the movable section 12 is connected to the stationary section by a hinge 13 of any suitable or preferred construction.

A locking plate 14 is connected to the free end of the hinged section 12 by means of rivets or the like 15 which are counter-sunk upon the outer face of the rim, as clearly shown in Figure 5. The outer end 16 of the plate 14 projects a substantial distance beyond the free end of the hinged section 12 and is provided upon its outer end with a beveled face 17 extending throughout the greater portion of the width of the plate and terminating at one side in a shoulder 18 for a purpose to be described. Outwardly of the beveled face 17, the plate 14 is provided with a transverse lug or projection 19 which cooperates with other elements of the device to be described to effect the locking of the sections of the rim.

Figure 2:
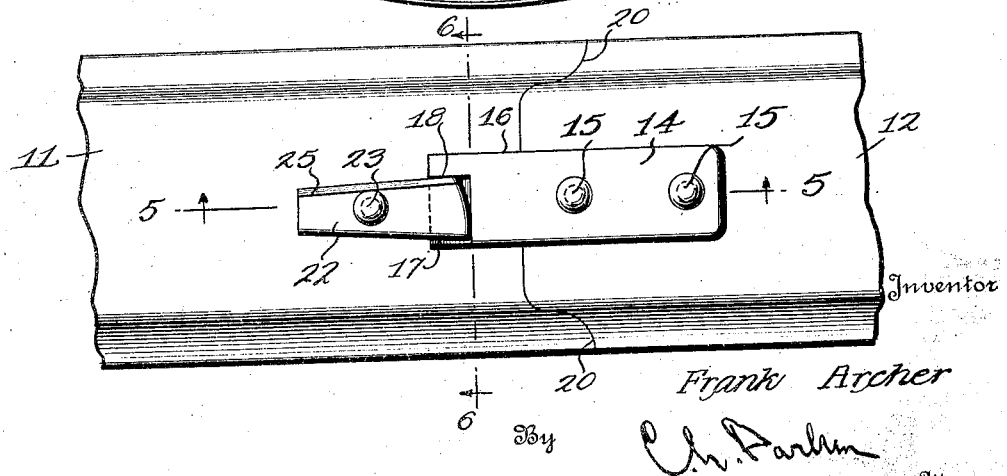
Figure 2 is a fragmentary plan view of the inner face of the rim showing the locking mechanism.

As clearly shown in Figures 1, 2 and 5, the free ends of the sections 11 and 12 of the rim are provided with beveled edges 20 whereby outward movement of the hinged section 12 is positively limited so that the free ends may be properly alined when the hinged section is in closed position.

The stationary section 11 of the rim is provided adjacent its free end with a central transverse opening 21 which is adapted to receive the lug 19 when the hinged section 12 of the rim is in closed position, as clearly shown in Figures 5 and 6. A locking member 22 is pivotally connected adjacent the free end of the rim section 11 by means of a rivet 23 intermediate its ends. The locking member is preferably slightly tapered as shown and is provided beneath its wider end with an undercut eccentric cam face 24 as shown in Figures 4 and 5. One edge of the locking member 22 is beveled as at 25 for a purpose to be described.

The operation of the device is as follows:

When it is desired to place a tire upon the rim, the free end of the hinged rim section 12 is swung inwardly to any desired position as shown in Figure 1. The tire is then placed on the rim in the usual manner and, with the parts substantially in the position shown in Figure 1, the foot of the operator may be pressed downwardly upon the free end of the hinged rim section until the lug 19 snaps into engagement within the opening 21. The lug 19 and opening 21 are preferably of the same size and shape whereby lateral movement of the free ends of the rim sections is effectually prevented as well as inward arcuate movement of the free end of the hinged section. The locking member 22 is then turned by hand until the cam face 24 engages the bevel face 17 of the plate 14. The free end of the locking member 22 then may be tapped with a hammer upon the edge adjacent the beveled portion 25 until the opposite end of this edge engages against the shoulder 18 which limits the turning movement of the locking member. The rim is then placed upon the felly of the wheel in the usual manner. To remove the tire, the locking member may be tapped upon the opposite edge of its free end until the cam face 24 is disengaged from the beveled face 17 as shown in Figure 3. The free end of the rim may then be sprung inwardly by hand or tapped with a hammer to release the lug 19 from the opening 21 whereupon the hinged section may be swung inwardly to the position shown in Figure 1. The bevel face 25 permits the end of the hinged section to be swung inwardly without interference by the locking member. The tire then is removed in the usual manner, a new tire replaced and the hinged section 12 again locked in position in the manner previously described.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A rim comprising a pair of sections hingedly connected to provide a pair of relatively movable ends, said ends being beveled whereby one is adapted to be swung inwardly, one of said ends being provided with a transverse opening, a locking member pivoted intermediate its ends to said last named end adjacent said opening, said locking member being provided with an arcuate under-cut beveled cam face adapted in one position to be arranged opposite said opening, and a plate carried by the other of said ends and projecting therebeyond, said plate being provided adjacent its end with a transverse lug adapted to be received in said opening and being further provided opposite said lug with a beveled face adapted to be engaged by the cam face of said locking member, said beveled face being provided with a shoulder arranged in the path of said locking member.

In testimony whereof I affix my signature.

FRANK ARCHER.